(12) United States Patent
Elkatatny et al.

(10) Patent No.: US 10,479,919 B2
(45) Date of Patent: *Nov. 19, 2019

(54) METHOD FOR DRILLING A HYDROGEN SULFIDE-CONTAINING FORMATION

(71) Applicant: KING FAHD UNIVERSITY OF PETROLEUM AND MINERALS, Dhahran (SA)

(72) Inventors: Salah El-Din Elkatatny, Dhahran (SA); Reyad Awwad Shawabkeh, Dhahran (SA); Mohamed Ahmed Nasr El-Din Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,100

(22) Filed: Mar. 20, 2019

(65) Prior Publication Data
US 2019/0218441 A1 Jul. 18, 2019

Related U.S. Application Data

(63) Continuation of application No. 15/724,809, filed on Oct. 4, 2017, now Pat. No. 10,301,524.

(51) Int. Cl.
*E21B 41/02* (2006.01)
*C09K 8/08* (2006.01)
(Continued)

(52) U.S. Cl.
CPC .......... *C09K 8/08* (2013.01); *C09K 8/032* (2013.01); *C09K 8/16* (2013.01); *C09K 8/532* (2013.01);
(Continued)

(58) Field of Classification Search
None
See application file for complete search history.

(56) References Cited

U.S. PATENT DOCUMENTS

3,171,811 A 3/1965 Keirstead et al.
3,928,211 A 12/1975 Browning et al.
(Continued)

FOREIGN PATENT DOCUMENTS

CN 1282778 A * 2/2001
CN 103506071 A * 1/2014
JP 2005-37188 A * 2/2005

OTHER PUBLICATIONS

J. Buller, et al., "H2S Scavengers for Non-Aqueous Systems", SPE International Symposium on Oilfield Chemistry, Feb. 2-4, 2005, 3 pages (Abstract only). (Year: 2005).*

(Continued)

*Primary Examiner* — Andrew Sue-Ako
(74) *Attorney, Agent, or Firm* — Oblon, McClelland, Maier & Neustadt, L.L.P.

(57) ABSTRACT

A drilling fluid composition comprising an aqueous base fluid, a viscosifier, and a $H_2S$ scavenger comprising copper nitrate, wherein the drilling fluid composition has a $H_2S$ sorption capacity from about 4.0 to about 6.0 gram per one milliliter of the drilling fluid composition; and a method of drilling a subterranean geological formation using thereof are provided. Various embodiments of the drilling fluid composition and the method are also provided.

7 Claims, 4 Drawing Sheets

(51) Int. Cl.
  *E21B 21/00* (2006.01)
  *C09K 8/03* (2006.01)
  *C09K 8/532* (2006.01)
  *C09K 8/16* (2006.01)
  *E21B 21/06* (2006.01)
  *E21B 43/26* (2006.01)

(52) U.S. Cl.
  CPC ............ *E21B 21/003* (2013.01); *E21B 41/02* (2013.01); *C09K 2208/20* (2013.01); *E21B 21/062* (2013.01); *E21B 43/26* (2013.01)

(56) References Cited

U.S. PATENT DOCUMENTS

| | | |
|---|---|---|
| 4,251,495 A | 2/1981 | Deschamps et al. |
| 4,778,007 A | 10/1988 | Van Laar |
| 4,871,024 A | 10/1989 | Cizek |
| 8,822,386 B2 | 9/2014 | Quintero et al. |
| 9,605,194 B2 | 3/2017 | Hall et al. |
| 10,301,524 B2 * | 5/2019 | Elkatatny ................ C09K 8/08 |
| 2002/0041842 A1 | 4/2002 | Ruettinger et al. |
| 2009/0145849 A1 | 6/2009 | Davis et al. |
| 2011/0100630 A1 | 5/2011 | Evans et al. |
| 2013/0312974 A1 | 11/2013 | McClung, IV |
| 2015/0218342 A1 | 8/2015 | Martin |
| 2015/0354323 A1 | 12/2015 | Treybig et al. |
| 2016/0222279 A1 | 8/2016 | Cassidy |
| 2019/0218442 A1* | 7/2019 | Elkatatny ............... C09K 8/032 |

OTHER PUBLICATIONS

M.K. Amosa, et al., "Sulphide Scavengers in Oil and Gas Industry—A Review", NAFTA, vol. 61, No. 2, 2010, pp. 85-92. (Year: 2010).*

International Search Report and Written Opinion of the International Searching Authority dated Mar. 4, 2019, in PCT/IB2018/001241. (Year: 2019).*

* cited by examiner

METHOD FOR DRILLING A HYDROGEN SULFIDE-CONTAINING FORMATION

CROSS-REFERENCE TO RELATED APPLICATIONS

The present application is a Continuation of Ser. No. 15/724,809, now allowed, having a filing date of Oct. 4, 2017.

BACKGROUND OF THE INVENTION

Technical Field

The present invention relates to a method of drilling a subterranean geological formation with a drilling fluid composition that includes an aqueous base fluid, a viscosifier, and a $H_2S$ scavenger comprising copper nitrate.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydrogen sulfide ($H_2S$) is a malodorous gas that is colorless, corrosive, and toxic. It is soluble in water, alcohol, and oil. $H_2S$ usually originates from geological sources or bacterial sources [Amosa, M. K.; Mohammed, I. A. Yaro, S. A, 2010, Sulfide Scavengers in Oil and Gas Industry—A Review, NAFTA, 61 (2010)]. It is a naturally occurring gas that can be found in gas reservoirs, hydrocarbon streams, water, liquid sulfur, etc. [King, F. W. 1974, Taking $H_2S$ from Liquid Sulfur—Why and How. The Oil and Gas Journal, Jun. 3, 1974]. Alternatively, $H_2S$ is produced by microbiological processes, for example, the reduction of sulfates by sulfate reducing bacteria (SRBs).

Due to the presence of $H_2S$ in geological formations, $H_2S$ is generally produced during drilling operations, particularly drilling sour reservoirs [Jiashen, Z., and Jingmao, Z. 1993, Control of Corrosion by Inhibitors in Drilling Muds Containing High Concentration of $H_2S$, Corrosion, 49(2): 170-174].

The existence of hydrogen sulfide even at low concentrations generally causes localized corrosion and stress cracking. Stevens et al., Kane et al., and Menendez et al. separately demonstrated that iron sulfide forms due to the presence of hydrogen sulfide, and the iron sulfide may plug the production tubing [Stevens, R., Ke, M., Javora, P. H., and Qi, Q. 2004. Oilfield Environment-Induced Stress Corrosion Cracking of CRAs in Completion Brines. Society of Petroleum Engineers, doi:10.2118/90188-MS; Kane, Russell D., Greer, J. Brison. 1977, Sulfide Stress Cracking of High-Strength Steels in Laboratory and Oilfield Environments. Journal of Petroleum Technology 29(11): 1483-1488; Menendez et al. 2011. New Method for Assessing Corrosion under Iron Sulfide Deposits and $CO_2/H_2S$ Conditions, Paper 11265, Corrosion Conference Proceedings]. Therefore, hydrogen sulfide needs to be removed or at least its concentration should be reduced to a tolerable threshold to avoid damage to the well tubing, pipelines, valves, and downstream facilities [Kembaiyan, K. T. and Keshavan, K. 1995, Combating severe fluid erosion and corrosion of drill bits using thermal spray coatings, Wear 186-187(2): 487-492, doi:10.1016/0043-1648(95)07142-3; Grondin, G. Y. and Kulak, G. L. 1994. Fatigue Testing of Drillpipe, SPE Drill & Comp. 9(2): 95-102, SPE-24224-PA; Tarver, G. A. and Dasgupta, P. K. 1995, Design and development of a system to measure ambient levels of hydrogen-sulfide and lower mercaptans from a mobile platform. Atmospheric Environment, 29 (11): 1291-1298]. In separate studies, Nguyen et al. and Chen et al. revealed that hydrogen sulfide catalyzes the absorption of hydrogen to steel, which facilitate sulfide stress cracking [Nguyen, P. T., Pham, V. H., Hoang, D. T., and Cao, M. L. 2001, Study of Corrosion Control Effect of $H_2S$ Scavengers in Multiphase Systems, Paper SPE 65399; Chen, C. and Huang, W. 1986, A Study of Sulfide Scavenger, Paper SPE 14859].

Triazines and glyoxal are among the most common hydrogen sulfide scavengers in oil and gas industries [Bakke, J. M.; Buhaug, J. B. 2004, Hydrogen Sulfide Scavenging by 1,3,5-Triazines, Comparison of the Rate of Reaction. Ind. Eng. Chem. Res., 43(9): 1962-1965; Bedtford, C. T.; Fallah, A.; Mentzer, E.; Williamson, 1992, The first characterization of a glyoxal-hydrogen sulfide adduct, J. Chem. Soc. Chem. Commun., 1992 (15): 1035-1036], however, utilizing these scavengers might not be useful. For example, Taylor et al. stated that intractable solids can be formed when using triazines as an $H_2S$ scavenging additive [Taylor, G. N., and Matherly, R. (2011), Structural elucidation of the solid byproduct from the use of 1,3,5-tris(hydroxyalkyl)hexahydro-s-triazine based hydrogen sulfide scavengers. Ind. Eng. Chem. Res. 50: 735-740]. On the other hand, Lehrer et al. [Lehrer, S., Jovancicevic, V., Braman, S. C., Soos, L., Macleod, J., & Kurrasch, J., 2015, New Hydrogen Sulfide Scavenger Development for Downhole Mixed Production Applications—Lab and Field Data, Society of Petroleum Engineers, doi:10.2118/173788-MS] revealed that triazines and glyoxal scavengers provide slow reactions when used in downhole injection applications. They also mentioned that neither triazines nor glyoxal are suitable $H_2S$ scavengers for downhole injection applications, because of the low thermal stability and, in the case of triazine, the high scaling tendency. In addition, Madsen [Madsen, H. T., 2011. Investigation of Fouling Formation during $H_2S$ Scavenging with 1,3,5-tri-(2-hydroxyethyl)-hexahydro-s-triazine, Master's Thesis, Aalborg University, June 2011] demonstrated that alkylamines can be formed during the hydrolysis of triazine. Formation of alkylamines causes a sudden jump in pH of the drilling fluid, which can be the cause for a number of issues in downstream processes such as production, refining operations, etc. due to scale deposition.

Lehrer et al. developed an organic acid-metal complex-based $H_2S$ scavenger (OAC), which is non-scaling and compatible with most metals, elastomers, and plastics [Lehrer, S., Jovancicevic, V., Braman, S. C., Soos, L., Macleod, J. & Kurrasch, J., 2015, New Hydrogen Sulfide Scavenger Development for Downhole Mixed Production Applications—Lab and Field Data, Society of Petroleum Engineers, doi:10.2118/173788-MS].

Zinc compounds such as zinc oxide or zinc carbonate are found to be effective when used as $H_2S$ scavenging additives. At pH levels of greater than 10, solid zinc scavengers can affect the rheological and filtration properties of the drilling fluid. As a result, zincate can be formed and carbonate can be released [Garrett, R. L., Clark, R. K., Carney, L. L., & Grantham, C. K., 1979, Chemical Scavengers for Sulfides in Water-Base Drilling Fluids, Journal of Petroleum Technology, 31(6): pp. 787-796]. A major disadvantage of using zinc scavengers is the potential environmental concerns that relate to using zinc-containing compounds.

In a separate study, Davidson et al. [Davidson, E., Hall, J., & Temple, C., 2004, An Environmentally Friendly Highly Effective Hydrogen Sulfide Scavenger for Drilling Fluids, SPE Drilling & Completion, 19(4): 229-234] revealed that iron-gluconate is an environmentally friendly scavenger for $H_2S$ in drilling fluids. However, Dugar et al. [Dugar, A. A., & Villalobos, M. J., 2013, Case History: Using Triazine Efficiently to Scavenge Hydrogen Sulfide in Coiled Tubing drilling Operations, Paper SPE 166761] showed that triazine-based scavengers are still better than iron-gluconate in removing $H_2S$, since triazine-based scavengers can remove twice the amount of $H_2S$ when compared to iron-gluconate, and therefore the overall cost of the $H_2S$ removal process is significantly reduced when triazine-based scavengers are used instead of iron-gluconate.

Lizhong et al. [Lizhong et al., 1980, American Drilling Handbook, trans. C. (Petroleum Industry Press] concluded that in order to protect the drillpipe in an $H_2S$ environment, the pH of the drilling fluid should be at least above 12, and also a $H_2S$ scavenger and an organic inhibitor should be present in the drilling fluid. In addition, Wendt [Wendt R. P., 1979, Control of Hydrogen Sulfide by Alkalinity may be Dangerous to your Health, Pet. Eng. Intl.] revealed that by keeping the pH of the drilling fluid at a value above 10, the release of hydrogen sulfide can effectively be controlled, since a large portion of sulfide compounds are in ionic form rather than in covalent form (as in $H_2S$).

Browning et al. (U.S. Pat. No. 3,928,211) showed that compounds such as $CuCO_3$, $ZnCO_3$, and $Zn(OH)_2$ can reduce initial soluble sulfide from about 1120 ppm to about 50 ppm. Sunde and Olsen used divalent iron salts for removal of $H_2S$ in drilling muds (U.S. Pat. No. 6,365,053). They showed that divalent iron, when present in a drilling mud, can absorb 0.1 to 1000 ppm of $H_2S$ at room temperature. Dyke and Wagner (U.S. Pat. No. 3,506,572) used copper carbonate and hydrogen peroxide for removal of $H_2S$ from gaseous streams.

In view of the forgoing, one objective of the present disclosure is to provide a drilling fluid composition that includes an aqueous base fluid, a viscosifier, and a $H_2S$ scavenger comprising copper nitrate. The presence of copper nitrate provides a high $H_2S$ sorption capacity of the drilling fluid composition without substantially affecting rheological properties of the drilling fluid composition. Another objective of the present disclosure relates to a method of drilling a subterranean geological formation using the drilling fluid composition and for removing $H_2S$ formed or produced during drilling or fracturing.

BRIEF SUMMARY OF THE INVENTION

According to a first aspect, the present disclosure relates to a drilling fluid composition, including i) an aqueous base fluid, ii) a viscosifier, iii) a $H_2S$ scavenger comprising copper nitrate.

In one embodiment, the $H_2S$ scavenger consists of copper nitrate.

In one embodiment, the $H_2S$ scavenger further includes at least one copper-containing compound selected from the group consisting of copper sulfate, copper molybdate, copper selenite, copper oxide, copper hydroxide, a copper halide, and hydrates thereof.

In one embodiment, the $H_2S$ scavenger is present in the drilling fluid composition at a mass concentration ranging from 0.1 to 20 pounds per one barrel of the drilling fluid composition.

In one embodiment, the aqueous base fluid is seawater.

In one embodiment, the drilling fluid composition has a $H_2S$ sorption capacity of 4.0 to 6.0 gram per one milliliter of the drilling fluid composition.

In one embodiment, the drilling fluid composition has a yield point ranging from 15 to 20 lb/100 ft$^2$, at a temperature of 20 to 60° C.

In one embodiment, the drilling fluid composition has a plastic viscosity ranging from 6 to 12 centipoises, at a temperature of 20 to 60° C.

In one embodiment, the drilling fluid composition has a yield point to plastic viscosity ratio of 1.5:1 to 3.0:1, at a temperature of 20 to 60° C.

In one embodiment, the drilling fluid composition has a ten-second gel strength of 2.0 to 6.0 lb/100 ft$^2$, and a ten-minute gel strength of 3.0 to 8.0 lb/100 ft$^2$, at a temperature of 20 to 60° C.

In one embodiment, the drilling fluid composition further includes at least one additive selected from the group consisting of a fluid-loss control agent, a weighting agent, an antiscalant, a deflocculant, a thickener, a lubricant, an anionic polyelectrolyte, a crosslinker, a breaker, a buffer, an interfacial tension reducer, and a biocide.

In one embodiment, the drilling fluid composition is not flammable.

According to a second aspect, the present disclosure relates to a method of drilling a subterranean geological formation, involving i) driving a drill bit to form a wellbore into the subterranean geological formation thereby producing a formation fluid that contains $H_2S$, ii) injecting a drilling fluid composition into the subterranean geological formation through the wellbore, wherein the drilling fluid composition comprises a) an aqueous base fluid, b) a viscosifier, c) a $H_2S$ scavenger comprising copper nitrate, and wherein copper nitrate present in the drilling fluid composition reacts with $H_2S$ present in the formation fluid to form copper sulfide.

In one embodiment, the wellbore is a horizontal or a multilateral wellbore.

In one embodiment, a temperature of the wellbore is in the range of 50 to 200° C.

In one embodiment, the wellbore contains a casing that is made of at least one metal selected from the group consisting of stainless steel, aluminum, and titanium, wherein a corrosion rate of the casing is no more than 0.0006 lb/ft$^2$ after 6 hours of contacting with the drilling fluid composition.

In one embodiment, the corrosion rate of the casing is no more than 0.00084 lb/ft$^2$ after 24 hours of contacting with the drilling fluid composition.

In one embodiment, the formation fluid is produced for at least 1 hour but no more than 4 hours, wherein a concentration of $H_2S$ in the formation fluid is no more than 40 ppm.

In one embodiment, the method further involves circulating the drilling fluid composition within the wellbore for at least 30 minutes but no more than 3 hours, after the injecting.

In one embodiment, the method further involves i) recovering the copper sulfide from the drilling fluid composition, ii) treating the copper sulfide with nitric acid to regenerate copper nitrate while concurrently forming elemental sulfur.

According to a third aspect, the present disclosure relates to a method of fracturing a subterranean geological formation, involving injecting the drilling fluid composition into the subterranean geological formation through a wellbore to fracture the subterranean geological formation, thereby producing a formation fluid that contains $H_2S$, wherein copper nitrate present in the drilling fluid composition reacts with $H_2S$ present in the formation fluid to form copper sulfide.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
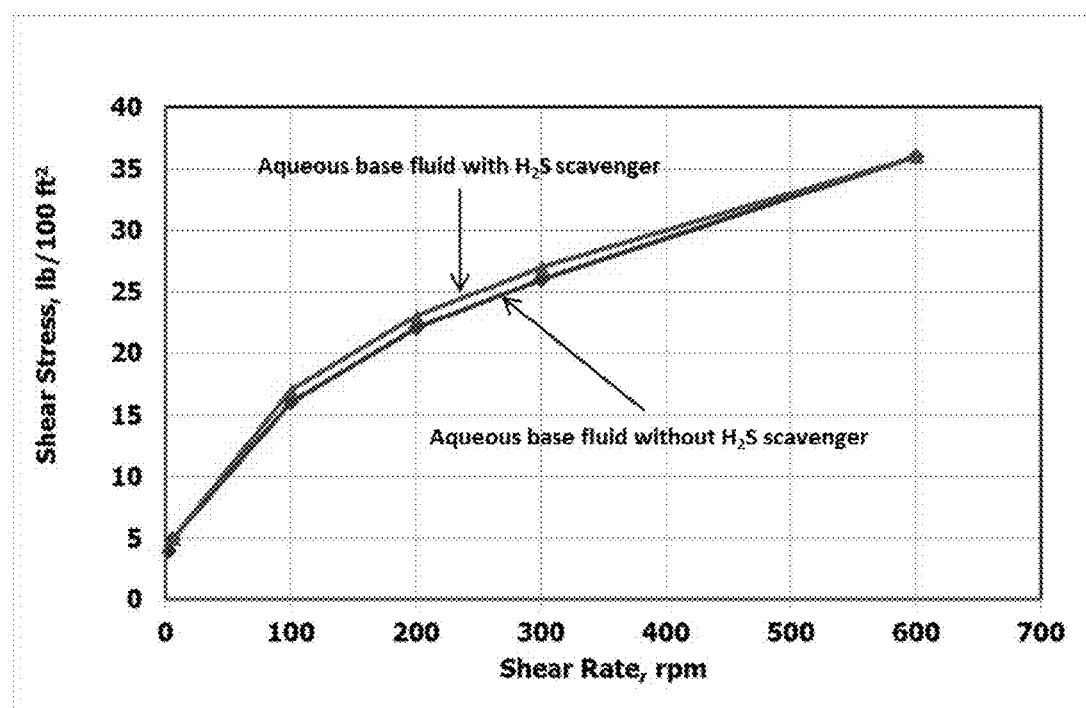
FIG. 1 represents a shear mode stress-strain behavior of an aqueous base fluid with and without a $H_2S$ scavenger that includes copper nitrate, at 120° F.

According to a first aspect, the present disclosure relates to a drilling fluid composition, including an aqueous base fluid, a viscosifier, and a $H_2S$ scavenger.

As used in this disclosure, the term "aqueous base fluid" refers to any water containing solution, including saltwater, hard water, and/or fresh water. For purposes of this description, the term "saltwater" may include saltwater with a chloride ion content of between about 6000 ppm and saturation, and is intended to encompass seawater and other types of saltwater including groundwater containing additional impurities typically found therein. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In one embodiment, the aqueous base fluid is present in at least 75 wt %, preferably at least 80 wt %, preferably at least 90 wt %, preferably at least 95 wt %, relative to the total weight of the drilling fluid composition. Preferably water represents at least 50 wt %, at least 75 wt %, at least 85 wt % or at least 95 wt % of the total weight of the liquid constituents of the drilling fluid composition.

In a preferred embodiment, the aqueous base fluid is seawater with a total dissolved solid in the range of 30,000 to 60,000 mg/L, preferably 35,000 to 59,000 mg/L, preferably 40,000 to 58,000 mg/L, preferably 50,000 to 57,000 mg/L, preferably about preferably 55,000 mg/L. In another embodiment, seawater has a salt concentration of at least 5,000 ppm, preferably at least 10,000 ppm, more preferably at least 30,000 ppm at a temperature in the range of 20 to 30 preferably about 25° C. The term "seawater", as used herein, may alternatively refer to water present in bays, lakes, rivers, creeks, as well as underground water resources, other than water present in oceans/seas.

The term "viscosifier" as used in this disclosure refers to an additive of the drilling fluid composition that increases the viscosity of the drilling fluid. Exemplary viscosifiers include, without limitation, bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earths and halloysite and the like. The viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (e.g. attapulgite, sepiolite), and mixtures thereof. Alternatively, the viscosifier may further include at least one thickening agent such as XC-polymer, xanthan gum, guar gum, glycol, and mixtures thereof. In one embodiment, the viscosifier is present in an amount of 0.01 to 20 wt %, preferably 0.05 to 15 wt %, preferably 0.1 to 10 wt %, preferably 0.5 to 5.0 wt %, relative to the total weight of the drilling fluid composition. In one embodiment, the viscosifier is bentonite. Other compounds may also be present in the bentonite of the present disclosure such as, e.g., potassium-containing compounds, iron-containing compounds, etc. There are different types of bentonite, named for the respective dominant element, such as potassium (K), sodium (Na), calcium (Ca) and aluminum (Al). In terms of the present disclosure, the term "bentonite" may refer to potassium bentonite, sodium bentonite, calcium bentonite, aluminum bentonite, and mixtures thereof, depending on the relative amounts of potassium, sodium, calcium, and aluminum in the bentonite. In one embodiment, the bentonite is present in 0.1 to 10 wt % relative to the total weight of the drilling fluid composition, preferably 0.5 to 5 wt %, preferably 0.8 to 2 wt %, preferably 1.0 to 1.5 wt %, relative to the total weight of the drilling fluid composition.

The term "$H_2S$ scavenger" as used in this disclosure refers to an additive in the drilling fluid composition that reduces a concentration or mitigates an effect of hydrogen sulfide ($H_2S$) in a formation fluid that is produced from a wellbore. The $H_2S$ scavenger may further reduce a concentration of sulfur-containing compounds, e.g., thiophene, methyl mercaptan or ethyl mercaptan in the formation fluid.

The $H_2S$ scavenger contains copper nitrate, hydrates thereof and/or derivatives thereof. For example, in some embodiments, the $H_2S$ scavenger contains copper nitrate monohydrate, copper nitrate sesquihydrate, copper nitrate trihydrate, copper nitrate hemi(pentahydrate), copper nitrate hexahydrate, etc. When dissolved in solution the copper nitrate is considered to have the formula $Cu(NO_3)_2$. The $H_2S$ scavenger may also contain trace amounts of monovalent copper nitrate (i.e. cuprous nitrate with molecular formula of $CuNO_3$), although preferably the amount of monovalent copper nitrate in the $H_2S$ scavenger is no more than 5 wt %, preferably no more than 2 wt %, preferably no more than 1 wt %, relative to the total weight of the $H_2S$ scavenger. In some embodiments, the amount of divalent copper nitrate (i.e. $Cu(NO_3)_2$) and hydrates and derivatives thereof in the $H_2S$ scavenger is at least 80 wt %, preferably at least 90 wt %, preferably at least 95 wt %, relative to the total weight of the $H_2S$ scavenger. In some preferred embodiments, the $H_2S$ scavenger consists of copper nitrate, and hydrates and derivatives thereof.

Besides copper nitrate, the $H_2S$ scavenger may further include at least one copper-containing compound selected from the group consisting of a copper sulfate, a copper molybdate, a copper oxide, a copper hydroxide, a copper halide, a copper carbonate, a copper hydroxy carbonate, a copper carboxylate, a copper phosphate, and hydrates and derivatives thereof. The amount of the at least one copper-containing compound, when present in the $H_2S$ scavenger, may preferably be no more than 10 wt %, preferably no more than 5 wt %, preferably no more than 2 wt %, relative to the total weight of the $H_2S$ scavenger.

In some embodiments, the $H_2S$ scavenger may further include at least one divalent ion selected from the group consisting of $Ca^{2+}$, $Mg^{2+}$, $Fe^{2+}$, $Zn^{2+}$, $Co^{2+}$, $Ni^{2+}$, $Pb^{2+}$, and $Sn^{2+}$.

In a preferred embodiment, the scavenger is present in the drilling fluid composition at a mass concentration ranging from 0.1-20 lbs/bbl (i.e. pounds of the $H_2S$ scavenger per one barrel of the drilling fluid composition), preferably 0.3-15 lbs/bbl, preferably 0.4-10 lbs/bbl, preferably 0.5-5 lbs/bbl, preferably 0.8-3 lbs/bbl, more preferably 1-2 lbs/bbl. In another embodiment, the mass concentration of the $H_2S$ scavenger in the drilling fluid composition is determined with respect to the concentration of $H_2S$ in the formation fluid. For example, in one embodiment, the concentration of $H_2S$ in the formation fluid is in the range from about 200 to about 1,000 ppm, preferably from about 300 to about 800 ppm, wherein the mass concentration of the $H_2S$ scavenger is in the range from about 0.5-5 lbs/bbl, preferably 0.8-3 lbs/bbl, more preferably 1-2 lbs/bbl.

Preferably, copper nitrate may first be mixed with at least a first portion of the aqueous base fluid and stirred to form a homogeneous mixture, and the homogeneous mixture may further be introduced into a second portion of the aqueous base fluid to obtain the aforementioned mass concentrations. In some embodiments, hydrated copper nitrate is adsorbed onto a piece of clay to form a claycop, and the claycop is further introduced into the drilling fluid composition as the $H_2S$ scavenger.

In some embodiments, the $H_2S$ scavenger preferably does not include an amine compound such as, e.g., mono-ethanolamine or ethanolamine, diglycolamine, methyldiethanolamine, etc. or other metal-based $H_2S$ scavenger such as zinc compounds.

In some embodiments, the drilling fluid composition further includes at least one additive selected from the group consisting of a fluid-loss control agent, a weighting agent, an antiscalant, a deflocculant, a lubricant, a crosslinker, a breaker, a buffer, and a biocide.

The term "fluid-loss control agent" as used herein refers to an additive of the drilling fluid composition that controls loss of the drilling fluid when injected into a subterranean geological formation. Exemplary fluid-loss control agents include, but are not limited to starch, polysaccharides, silica flour, gas bubbles (energized fluid or foam), benzoic acid, soaps, resin particulates, relative permeability modifiers, degradable gel particulates, diesel or other hydrocarbons dispersed in fluid, and other immiscible fluids. Preferably, a weight percent of the fluid-loss control agent, when present in the drilling fluid composition, is no more than 5.0 wt %, preferably in the range of 0.01 to 4.0 wt %, preferably 0.05 to 3.0 wt %, preferably 0.1 to 2.0 wt %, preferably 0.5 to 1.5 wt %, preferably about 1.0 wt %, relative to the total weight of the drilling fluid composition.

The term "weighting agent" as used herein refers to particles that increase an overall density of the drilling fluid in order to provide sufficient bottom-hole pressure to prevent an unwanted influx of formation fluids. Exemplary weighting agents include, without limitation, calcium carbonate (chalk), barite, sodium sulfate, hematite, siderite, ilmenite, and combinations thereof. Preferably, a weight percent of the weighting agent, when present in the drilling fluid composition, is no more than 20 wt %, preferably no more than 15 wt %, preferably in the range of 5.0 wt % to 15 wt %, preferably 6.0 wt %, to 10 wt %, preferably 7.0 wt % to 8.0 wt %, relative to the total weight of the drilling fluid composition. An average particle size of the weighting agent is preferably no more than 50 μm, preferably in the range of 20 to 40 μm.

The term "antiscalant" as used herein refers to an additive that prevents, slows, minimizes, and/or stops the precipitation of scale in the drilling fluid composition. Exemplary antiscalants include, but are not limited to, phosphine, sodium hexametaphosphate, sodium tripolyphosphate and other inorganic polyphosphates, hydroxy ethylidene diphosphonic acid, butane-tricarboxylic acid, phosphonates, itaconic acid, 3-allyloxy-2-hydroxy-propionic acid, and the like. Preferably, a weight percent of the antiscalant, when present in the drilling fluid composition, is no more than 5.0 wt %, preferably no more than 2.0 wt %, relative to the total weight of the drilling fluid composition.

The term "deflocculant" as used herein refers to an additive of the drilling fluid composition that prevents a colloid from coming out of suspension or to thin suspensions or slurries, and may be used to reduce viscosity of clay-based fluids. Exemplary deflocculants include, but are not limited to, an anionic polyelectrolyte, such as acrylates, polyphosphates, lignosulfonates (Lig), or tannic acid derivatives such as Quebracho. Preferably, a weight percent of the deflocculant, when present in the drilling fluid composition, is no more than 5.0 wt %, preferably no more than 2.0 wt %, relative to the total weight of the drilling fluid composition.

In one embodiment, the drilling fluid composition also includes a lubricant. The lubricant may be a synthetic oil or a biolubricant, such as those derived from plants and animals for example vegetable oils. Examples of synthetic oils that may be used in the drilling fluid composition include, but are not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC). Exemplary vegetable oil-based lubricants (i.e. biolubricants) that may be used in the present disclosure include condo oil, castor oil, palm oil, sunflower seed oil and rapeseed oil from vegetable sources, and Tall oil from tree sources, and the like. Preferably, a weight percent of the lubricant, when present in the drilling fluid composition, is no more than 5.0 wt %, preferably no more than 2.0 wt %, relative to the total weight of the drilling fluid composition.

The term "crosslinker" as used herein refers to an additive of the drilling fluid composition that can react with multiple-strand polymers to couple the molecules together, thereby creating a highly viscous fluid, with a controllable viscosity. Exemplary crosslinkers may include, but are not limited to, metallic salts, e.g. salts of Al, Fe, B, Ti, Cr, and Zr, or organic crosslinkers such as polyethylene amides and/or formaldehyde. Preferably, a weight percent of the crosslinker, when present in the drilling fluid composition, is no more than 2.0 wt %, preferably no more than 1.0 wt %, relative to the total weight of the drilling fluid composition.

The term "breaker" as used herein refers to an additive of the drilling fluid composition that provides a desired viscosity reduction a specified period of time. Examples of the breakers include, but are not limited to, oxidizing agents such as sodium chlorites, sodium bromate, hypochlorites, perborate, persulfates, and peroxides, as well as enzymes. Preferably, a weight percent of the breaker, when present in the drilling fluid composition, is no more than 2.0 wt %, preferably no more than 1.0 wt %, relative to the total weight of the drilling fluid composition.

The term "buffer" as used herein refers to an additive of the drilling fluid composition that s used to adjust the pH of the drilling fluid composition. Exemplary buffers include, but are not limited to, monosodium phosphate, disodium phosphate, sodium tripolyphosphate, and the like. Preferably, a weight percent of the buffer, when present in the drilling fluid composition, is no more than 2.0 wt %, preferably no more than 1.0 wt %, relative to the total weight of the drilling fluid composition.

The tem "biocide" as used herein refers to an additive of the drilling fluid composition that that kills bacteria and other microorganisms present in the drilling fluid composition. Exemplary biocides include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and a 2-bromo-2-nitro-1,3-propane diol. Preferably, a weight percent of the biocide, when present in the drilling fluid composition, is no more than 2.0 wt %, preferably no more than 1.0 wt %, relative to the total weight of the drilling fluid composition.

Thorough mixing of the aqueous base fluid, the viscosifier, the $H_2S$ scavenger, and the at least one additive, when present, is desirable to avoid creating lumps or "fish eyes." Preferably, the viscosifier (e.g. bentonite) is thoroughly mixed with the aqueous base fluid, and the $H_2S$ scavenger is added to the aqueous base fluid thereafter. Preferably, the weighting agent, when present, is mixed with the aqueous base fluid along with the viscosifier. To avoid lumps or "fish eyes" the drilling fluid composition may be stirred with a stirring speed of 1 to 800 rpm, or 5 to 700 rpm, or 10 to 600 rpm. The drilling fluid composition may preferably be mixed for a sufficient period of time to allow for hydration of the viscosifier (e.g. bentonite) in the aqueous base fluid, and this period of time is usually between about 5 and about 60 minutes, preferably between about 10 and about 40 minutes, preferably between about 20 and about 30 minutes. Other mixing times may be also utilized to make the drilling fluid composition (e.g. less than 5 minutes, or more than 60 minutes) so long as the drilling fluid composition is substantially free of lumps.

The pH of the drilling fluid composition may be adjusted according to the drilling application. For example, the pH of the drilling fluid composition may be adjusted so as to increase solubility of various organic components (e.g. the deflocculant, the antiscalant, the lubricant, the biocide, etc.) in the drilling fluid composition. Accordingly, in some embodiments, the pH of the drilling fluid composition is in the range of 8 and 14, preferably between about 10 and about 12, preferably between about 10 and 11, more preferably about 10. This pH range may also be advantageously suited for drilling operations where acid promoted damage/corrosion to equipment, such as metal equipment is a concern. In an alternative embodiment, the pH of the drilling fluid composition is between about 1 and 8, preferably 2 and 7, more preferably 3 and 6. This pH range may be advantageously suited for drilling applications where scale formation is particularly problematic. Various acids (e.g. citric acid, phosphoric acid, hydrochloric acid, etc.), bases (e.g. hydroxide bases, carbonate bases, amine bases, etc.), and buffers (e.g. monosodium phosphate, disodium phosphate, sodium tripolyphosphate, etc.) may be used to buffer or to adjust the pH of the drilling fluid composition, and such acids, bases, and buffers are known to those of ordinary skill in the art.

Figure 4:
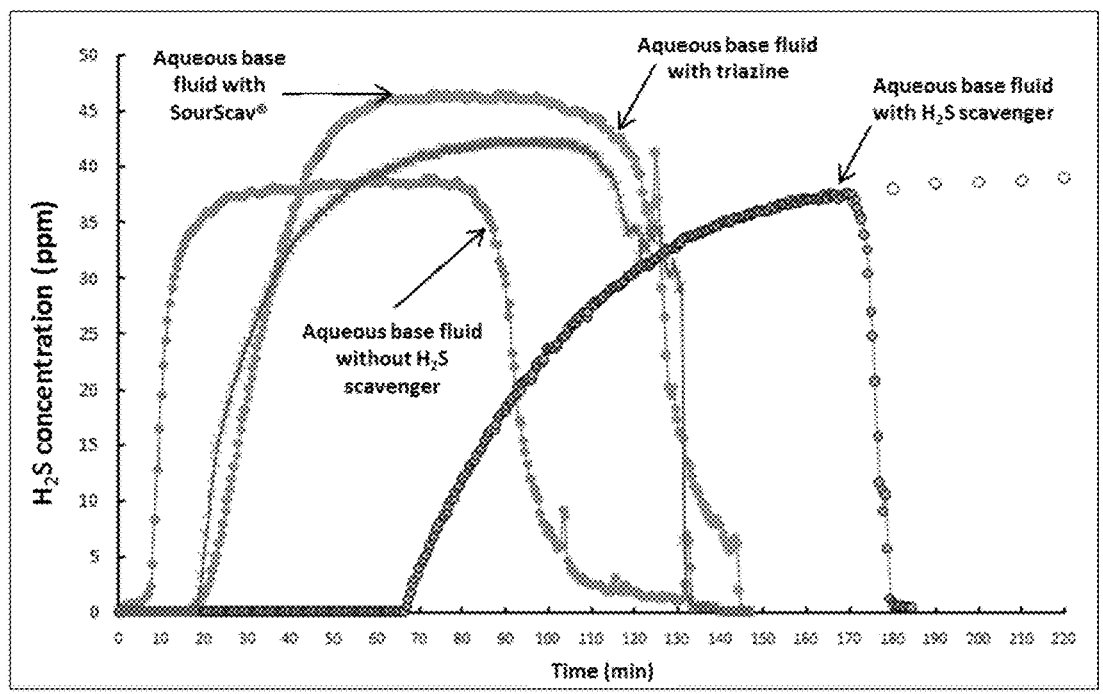
FIG. 4 represents breakthrough curves of $H_2S$ sorption of the aqueous base fluid, the aqueous base fluid with triazine, the aqueous base fluid with SourScav®, and the aqueous base fluid with copper nitrate.

In one embodiment, the drilling fluid composition has a $H_2S$ sorption capacity from about 4.0 to about 6.0 gram, preferably from about 4.5 to about 5.5 g, preferably from about 5.0 to about 5.2 g of $H_2S$ per one milliliter of the drilling fluid composition. In one embodiment, the $H_2S$ sorption capacity of the drilling fluid composition is determined according to ASTM D5705. Preferably, the $H_2S$ sorption capacity of the drilling fluid composition is at least three times, preferably at least four times, preferably at least five times larger than drilling fluid compositions that utilize $H_2S$ scavengers such as, e.g., SourScav®, tirazine, etc. (as shown in FIG. 4). Furthermore, in some embodiments, the drilling fluid composition is at 50%, preferably at least 75%, preferably at least 80%, less expensive than drilling fluid compositions that contain $H_2S$ scavengers such as SourScav, triazine, iron-gluconate, zinc-based scavengers, etc. In addition, the drilling fluid composition may preferably not be flammable and not toxic due to the absence of triazine and/or other organic $H_2S$ scavengers therein.

In some embodiments, American Petroleum Institute (API) specification of the drilling fluid compositions is determined using a Fann viscometer (or a V-G meter). Accordingly, in some embodiments, the drilling fluid compositions are prepared after mixing the drilling fluid compositions for 20 minutes, overnight aging, and stirring for about 25 minutes. The Fann viscometer is used to determine standard drilling fluid parameters as follows:

Plastic viscosity (PV, cP)=600 dial (i.e. rpm reading)−300 dial

Yield point (YP, lb/100 ft$^2$)=300 dial−plastic viscosity

Figure 2:
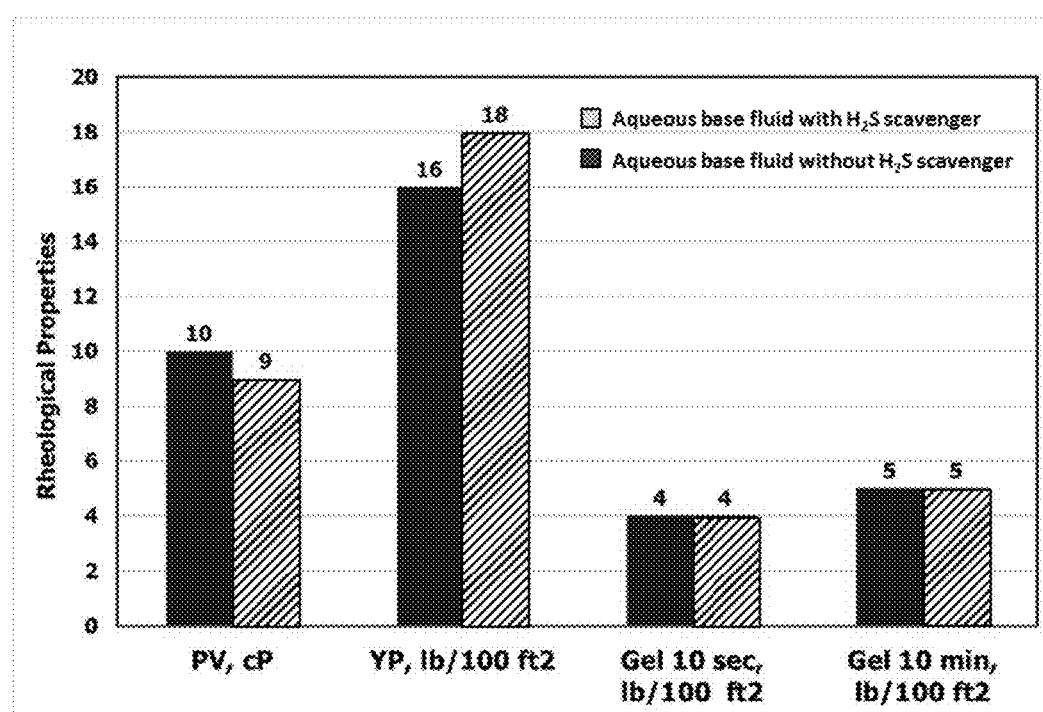
FIG. 2 represents rheological properties of the aqueous base fluid with and without the $H_2S$ scavenger that includes copper nitrate, at 120° F.

Gel Strength (GS, lb/100 ft$^2$) is measured by taking a 3 rpm reading, allowing the drilling fluid composition to set for 10 seconds (i.e. a ten-second gel strength) or for 10 minutes (i.e. a ten-minute gel strengths). Since the above parameters are interrelated, once an acceptable plastic viscosity is obtained, other values may be determined subsequently. Preferably, the plastic viscosity, the yield strength, and the gel strength, are measured at a temperature in the range of 20 to 60 preferably in the range of 30 to 55° C., preferably in the range of 40 to 52° C., preferably in the range of 45 to 50° C.; and a pressure in the range of 0.8 to 1.2 atm, preferably 0.9 to 1.1 atm, preferably about 1.0 atm. The plastic viscosity, the yield strength, and the gel strength of the drilling fluid composition with and without the $H_2S$ scavenger are shown in FIG. 2.

In view of that, in some embodiments, the drilling fluid composition has a yield point ranging from 15 to 20 lb/100 ft$^2$, preferably 15.5 to 19 lb/100 ft$^2$, preferably 16 to 18 lb/100 ft$^2$. The yield point of the drilling fluid composition that includes $H_2S$ scavenger may be no more than 5.0 lb/100 ft$^2$, preferably no more than 2.0 lb/100 ft$^2$ higher than the yield point of a drilling fluid composition that does not includes $H_2S$ scavenger. Yet in some other embodiments, the drilling fluid composition has a plastic viscosity ranging from 6 to 12 centipoises (cP), preferably 8 to 10 cP, which is preferably substantially the same as the plastic viscosity of a drilling fluid composition that does not includes H₂S scavenger. Accordingly, the drilling fluid composition has a yield point to plastic viscosity ratio in the range of 1.5:1 to 3.0:1, preferably 1.8:1 to 2.5:1, preferably about 2.0:1, which is higher than the yield point to plastic viscosity ratio of a drilling fluid composition that does not includes H₂S scavenger. The yield point to plastic viscosity ratio of a drilling fluid composition that does not includes H₂S scavenger may be in the range of 1.2:1 to 2.0:1, or 1.4:1 to 1.8:1, or about 1.6:1.

Also, in some embodiments, the ten-second gel strength of the drilling fluid composition is in the range of 2.0 to 6.0 lb/100 ft², preferably 3.0 to 5.0 lb/100 ft², preferably about 4.0 lb/100 ft², which is substantially the same as the ten-second gel strength of a drilling fluid composition that does not includes H₂S scavenger. In addition, the ten-minute gel strength of the drilling fluid composition is in the range of 3.0 to 8.0 lb/100 ft², preferably 4.0 to 6.0 lb/100 ft², preferably about 5.0 lb/100 ft², which is substantially the same as the ten-second gel strength of a drilling fluid composition that does not includes H₂S scavenger.

In one embodiment, the stress-strain behavior of the drilling fluid composition in shear mode is substantially the same as the stress-strain behavior of a drilling fluid composition that does not includes H₂S scavenger, as shown in FIG. 1. The term "substantially the same" as used in this disclosure refers to a condition wherein a difference between two quantities are no more than 5%, preferably no more than 1%, preferably no more than 0.5% of the smaller value of the two quantities.

In one embodiment, the drilling fluid composition has a density in the range of 8 to 12 ppg (pounds per gallon), preferably 9 to 11 ppg, preferably about 9.6 ppg at a temperature in the range of 20 to 60° C., preferably in the range of 30 to 55° C. preferably in the range of 40 to 52° C. preferably in the range of 45 to 50° C. The density of the drilling fluid composition may be substantially the same as the density of a drilling fluid composition that does not includes H₂S scavenger.

In some embodiments, the drilling fluid composition operates as a treatment fluid. The term "treatment fluid" as used herein refers to a fluid that is intended to treat a subterranean geological formation to achieve an increased permeability by at least partial dissolution of the formation; the removal of small particles; and/or the removal of inorganic scale, to enhance the well performance and enable an increased production of a formation fluid, e.g. oil or gas, from the subterranean geological formation. At the same time, the drilling fluid composition may be utilized to clean and descale a wellbore and/or production equipment.

According to a second aspect, the present disclosure relates to a method of drilling a subterranean geological formation. The method involves driving a drill bit to form a wellbore into the subterranean geological formation and then injecting the drilling fluid composition into the subterranean geological formation through the wellbore.

In some embodiments, a site of interest is first identified, and a drill truck drills a starter hole. Then, the wellbore is drilled with the drill bit coupled to a motor. The drill bit and the motor used in this disclosure are not meant to be limiting and various drill bits and motors may be utilized. The wellbore may be drilled to a depth of at least 1,000 m, preferably at least 2,000 m, preferably at least 5,000 m, preferably at least 7,000 m, but no more than 10,000 m. A formation fluid may be produced during or after the drilling. During the drilling, the drilling fluid composition is injected optionally into the subterranean geological formation through the wellbore to lubricate and cool the drill bit and to remove drilling cuttings. In some embodiments, the drilling fluid composition is injected at a flow rate ranging from 12 to 26 L/s, preferably 15 to 22 L/s, more preferably 17 to 20 L/s.

A composition of the formation fluid that may be produced during or after the drilling depends on the type of the subterranean geological formation. For example, in some embodiments, the formation fluid may contain various combinations of natural gas (i.e., primarily methane), light hydrocarbon or non-hydrocarbon gases (including condensable and non-condensable gases), light hydrocarbon liquids, heavy hydrocarbon liquids, crude oil, rock, oil shale, bitumen, oil sands, tar, coal, and/or rater. Exemplary non-condensable gases include hydrogen, carbon monoxide, carbon dioxide, methane, and other light hydrocarbons. In some other embodiments, the formation fluid may be in the form of a gaseous fluid, a liquid, or a double-phase fluid (i.e. containing a gaseous phase and a liquid phase).

In a preferred embodiment, a formation fluid that contains H₂S is produced during or after the drilling. The formation fluid is further contacted with the drilling fluid composition, wherein a portion of H₂S present in the formation fluid reacts with the H₂S scavenger, particularly with copper nitrate present in the H₂S scavenger, thereby forming copper sulfide. The reaction of hydrogen sulfide with copper nitrate is represented in equation (I):

$$H_2S+Cu(NO_3)_2 \rightarrow CuS+2HNO_3 \quad (I)$$

In another preferred embodiment, the method further involves recovering the copper sulfide from the drilling fluid composition. Recovering the copper sulfide may preferably be conducted by known methods to those skilled in the art, e.g. centrifugation, precipitation, etc. along with filtration and removing supernatants and other impurities.

Further, in another preferred embodiment, the copper sulfide is treated with nitric acid to regenerate copper nitrate while concurrently forming elemental sulfur via a chemical reaction as represented in equation (II):

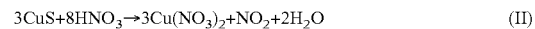

$$3CuS+8HNO_3 \rightarrow 3Cu(NO_3)_2+NO_2+2H_2O \quad (II)$$

The chemical reaction conditions may preferably be adjusted such that oxidation of sulfur to sulfuric acid is minimized. For example, in one embodiment, the copper sulfide is treated with nitric acid at a temperature in the range of 50 to 80° C., preferably 60 to 75° C.

The elemental sulfur, which may precipitate during treatment with nitric acid, may further be separated and may further be utilized in downstream processes such as sulfuric acid production plants, or applications such as vulcanization of rubber, production of fertilizers, pesticides, or organosulfur products for pharmaceutical industries, etc.

Copper nitrate may preferably be regenerated on-site (i.e. in an onshore or an offshore platform), or alternatively copper nitrate may be regenerated in a downstream processing plant.

The formation fluid may further include sulfur-containing compounds such as mercaptans, sulfides, disulfides, polysulfides, thiols, thioethers, thioesters, thioacetals, sulfoxides, sulfones, thiosulfonates, sulfimides, sulfoximides, sulfonediimines, s-nitrosothiols, sulfur halides, thioketones, thioaldehydes, thiocarbonyls, sulfur oxides, thiocarboxylic acids, thioamides, sulfonic acid, sulfinic acid, sulfenic acids, sulfonium, oxosulfonium, sulfuranes, and persulfuranes. In view of that, the drilling fluid composition may reduce the concentration of the sulfur-containing compounds in the formation fluid, or at least mitigate effects of the sulfur-containing compounds.

In one embodiment, the concentration of $H_2S$ in the formation fluid before injecting the drilling fluid composition is in the range from about 50 to about 10,000 ppm, preferably from about 100 to about 5,000 ppm, preferably from about 150 to about 3,000 ppm; whereas the concentration of $H_2S$ in the formation fluid after injecting the drilling fluid composition reduces down to a value in the range from about 1 to about 1,000 ppm, preferably from about 2 to about 500 ppm, preferably from about 5 to about 100 ppm. In another embodiment, the formation fluid is produced for at least 1 hour, preferably at least 2 hours, but no more than 4 hours, wherein the concentration of $H_2S$ in the formation fluid is no more than 40 ppm, preferably no more than 30 ppm, preferably no more than 20 ppm, preferably no more than 10 ppm, preferably no more than 5 ppm, preferably no more than 2 ppm.

As used herein, the term "wellbore" refers to a cased or an uncased portion of an oil/gas well, i.e. a borehole, that faces the formation matrix of the subterranean geological formation. The wellbore may have a vertical, a horizontal, and/or a multilateral borehole portion. A "horizontal" wellbore as used herein refers to a wellbore with at least one section located substantially parallel to the ground surface. Also, a "multilateral" wellbore as used herein refers to a wellbore with a main borehole and a plurality of branch-holes radiating from the main borehole, wherein the main borehole can be a vertical borehole or a horizontal borehole. A temperature of the wellbore may vary in the range from about 50 to about 200° C., or from about 80 to about 190° C., or from about 100 to about 170° C. Therefore, the drilling fluid composition may preferably withstand a temperature ranging from about 50 to about 200° C., preferably from about 80 to about 190° C., preferably from about 100 to about 170° C.

Figure 3:
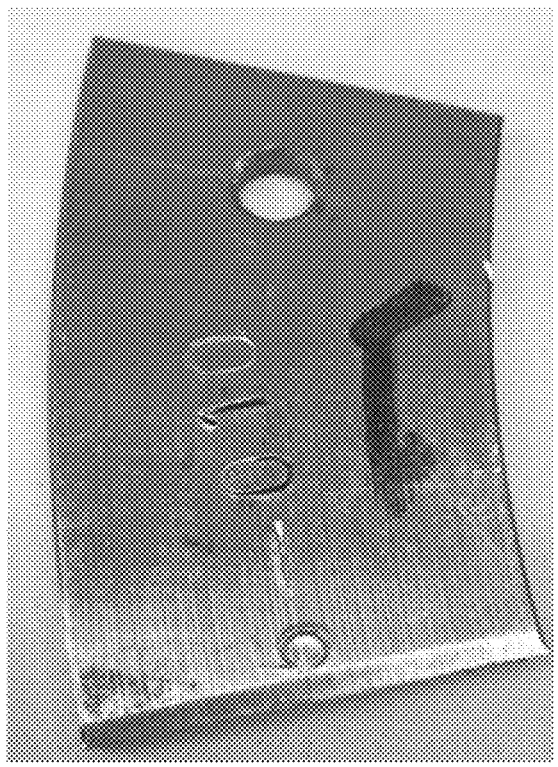
FIG. 3 is a picture of a casing coupon that is used for corrosion testing.

In some embodiments, the wellbore contains a casing that is made of at least one metal selected from the group consisting of stainless steel, aluminum, and titanium. A section of the casing is shown in FIG. 3. Accordingly, a corrosion rate of the casing, which is shown in FIG. 3, is no more than 0.0006 lb/ft$^2$, preferably no more than 0.00055 lb/ft$^2$, preferably no more than 0.0005 lb/ft$^2$, after 6 to 8 hours, preferably 6 to 6.5 hours of contacting with the drilling fluid composition. Also, the corrosion rate of the casing may preferably no more than 0.00084 lb/ft$^2$, preferably no more than 0.0008 lb/ft$^2$, preferably no more than 0.00075 lb/ft$^2$, after 24 to 30 hours, preferably 24 to 26 hours of contacting with the drilling fluid composition. Therefore, the presence of copper nitrate in the $H_2S$ scavenger preferably does not substantially intensify/enhance the corrosion rate of the casing when exposed to the drilling fluid composition. According to this embodiment, the corrosion rate is determined at a temperature in the range of 80 to 120° C. preferably 90 to 110° C., preferably about 100° C.; and a pressure in the range of 200 to 400 psi, preferably 250 to 350 psi, preferably about 300, when the casing is exposed to a gaseous mixture containing 8 vol % to 12 vol %, preferably about 10 vol % of $H_2S$, 8 vol % to 12 vol %, preferably about 10 vol % of $CO_2$, 75 vol % to 85 vol %, preferably about 80 vol % of $N_2$. In another embodiment, the corrosion rate of the casing, when exposed to the drilling fluid composition in temperatures and pressures of a downhole of a wellbore is determined via ASTM G111-97.

A percent loss of the aqueous base fluid during injecting the drilling fluid composition may preferably be no more than 5.0 vol %, preferably no more than 2.0 vol %, preferably no more than 1.0 vol %, preferably no more than 0.5 vol %, preferably no more than 0.1 vol %, relative to the total volume of the drilling fluid composition. The term "percent loss" as used herein refers to a volume percentile of a leaked aqueous base fluid relative to the total volume of the drilling fluid composition. In view of that, a reduction in the permeability of the subterranean geological formation after injecting the drilling fluid composition may preferably be no more than 5%, preferably no more than 2%, preferably no more than 1% relative to an initial permeability of the subterranean geological formation (i.e. the permeability before the injecting). For example, in one embodiment, the subterranean geological formation is a conventional reservoir (e.g. the Berea sandstone), wherein the permeability of the subterranean geological formation before injecting is in the range of 120 to 180 md (mili darcy), preferably 130 to 170 md, more preferably 140 to 160 md; whereas the permeability of the subterranean geological formation after injecting is in the range of 100 to 180 md darcy), preferably 110 to 160 md, more preferably 120 to 150 md. In another embodiment, the subterranean geological formation is an unconventional reservoir (e.g. the Scioto sandstone), wherein the permeability of the subterranean geological formation before injecting the drilling fluid composition is in the range of 1 to 10 md, preferably 2 to 8 md, more preferably 3 to 6 md; whereas the permeability of the subterranean geological formation after injecting is in the range of 0.5 to 10, preferably 1 to 7 md, more preferably 2 to 5 md.

For economic and environmental reasons, the drilling fluid composition may be cleaned and recirculated. In view of that, large drill cuttings are removed via a sieving process, for example, by passing the drilling fluid composition through one or more vibrating screens, and optionally fine cuttings are removed by passing the drilling fluid composition through centrifuges or screens with a small mesh size. Copper nitrate may be recovered from the drilling fluid composition before or after the sieving process. Then, the drilling fluid composition may be circulated within the wellbore. In some embodiments, the drilling fluid composition is circulated within the wellbore for at least 30 minutes, preferably at least 1 hour, but no more than 3 hours, preferably no more than 2 hours after the injecting. Preferably, the drilling fluid composition may not become more viscous or turn into a solid during circulating the drilling fluid composition.

According to a third aspect, the present disclosure relates to a method of fracturing a subterranean geological formation. The method involves injecting the drilling fluid composition into the subterranean geological formation through a wellbore to fracture and to form fissures in the subterranean geological formation. Accordingly, the drilling fluid composition may be injected at a pressure of at least 1,000 psi, at least 2,000 psi, at least 3,000 psi, at least 4,000 psi, at least 5,000 psi, at least 5,500 psi, at least 6,000 psi, at least 6,500 psi, at least 7,000 psi, but no more than 10,000 psi to fracture the subterranean geological formation. In another embodiment, the drilling fluid composition is injected at a pressure above a fracture pressure, i.e. a pressure above which a geological formation is susceptible to fracture. The pressure of injection depends on the type of the subterranean geological formation, and is known to those skilled in the art. In view of that, the drilling fluid composition may preferably withstand a pressure at least 8,000 psi, preferably at least 10,000 psi, preferably at least 15,000 psi, without becoming phase separated or disintegrated.

In a preferred embodiment, when the formation fluid that contains $H_2S$ is contacted with the drilling fluid composition, which is utilized for fracturing reservoir, a portion, of $H_2S$ present in the formation fluid reacts with the $H_2S$ scavenger, particularly with copper nitrate present in the $H_2S$ scavenger, thereby forming copper sulfide via the reaction pathway as represented in equation (I).

The term "fracturing" or "fracking" as used in this disclosure refers to a process for initiating and subsequently propagating a fracture in a formation rock by employing the pressure of a fluid as the source of energy. Accordingly, a hydraulic fracture may be formed by pumping a drilling fluid (i.e. the drilling fluid composition, in one or more of its embodiments) into the wellbore at a pressure sufficient to increase the pressure downhole to a value in excess of a fracture pressure of the formation rock. The pressure causes the formation rock to crack, thereby allowing the drilling fluid to enter and extend the crack farther into the formation rock. Following fracking by high pressures, the fractured formation allows more hydrocarbons (e.g., methane, condensate, ethane, oil) and/or water to be extracted since the formation walls are more porous. Fracking can be done in vertical wells, slanted wells, and in horizontally drilled wells. In addition, finking may be performed on conventional or unconventional reservoirs. As used herein, the term "conventional reservoir" may refer to a reservoir in which buoyant forces keep hydrocarbons in place below a sealing caprock. The formation and fluid characteristics of conventional reservoirs typically permit oil or natural gas to flow readily into the wellbores. An example of a conventional reservoir is Berea sandstone. In contrast, an "unconventional reservoir" may refer to a reservoir in which gas might be distributed throughout the reservoir at the basin scale, and in which buoyant forces or the influence of a water column on the location of hydrocarbons within the reservoir are not sufficient to create a readily flow of oil or natural gas into the wellbores. An example of an unconventional reservoir is Scioto sandstone.

The examples below are intended to further illustrate protocols for the drilling fluid composition, and are not intended to limit the scope of the claims.

Example 1

The following example overview the composition of a drilling fluid and the corresponding rheological properties of the drilling fluid based on the API standard. The results showed that adding copper nitrate with a mass concentration of 1.0 lb/bbl (lb of copper nitrate per one barrel of the drilling fluid) enhanced both the $H_2S$ scavenging properties without affecting Theological properties. Also, breakeven experiments showed that the developed drilling fluid gas has about three times the $H_2S$ sorption capacity when compared to that of conventional triazine fluid (5143 mg $H_2S$/ml of developed fluid and 1666 mg $H_2S$/ml of triazine-based fluid). Moreover, the yield point/plastic viscosity ratio for this developed fluid was increased by about 20% without affecting its stress-strain behavior in shear mode. The corrosion rate of the developed drilling fluid was found to be negligible (i.e. 0.00060 $lb/ft^2$ after 6 hrs and 0.00084 $lb/ft^2$ after 24 hrs at 100° C.). The standard corrosion ($H_2+CO_2$, $N_2$) test of the developed formulation showed that the corrosion rate was 0.00077 $lb/ft^2$ after 6 hrs at 100° C.

Example 2

The drilling fluid was prepared by mixing 1.5 grams of XC-polymer (as the viscosifier), 6.0 grams of starch (as a fluid loss control), and 30.0 grams of calcium carbonate (as the weighting agent), with distilled water. In addition, some other additives were also introduced as shown in Table 1.

TABLE 1

Drilling fluid formula for lab scale.

| Material | Quantity | Units |
| --- | --- | --- |
| Distilled Water | 308 | g |
| Defoamer | 0.33 | $cm^3$ |
| XC-polymer | 1.50 | g |
| Starch | 6.00 | g |
| KCl | 80 | g |
| KOH | 0.30 | g |
| Sodium sulfide | 0.25 | g |
| $CaCO_3$ (50 μm) | 30 | g |

FIG. 1 shows the stress-strain behavior of the drilling fluid at 120° F. It was found that, the drilling fluid has a density of about 9.6 ppg, a plastic viscosity of about 10 cP, a yield point of about 16 lb/100 $ft^2$, and 10 s, and 10 min gel strength of 4 and 5 lb/100 $ft^2$, respectively. These rheological properties are listed in Table 2 as well as FIG. 2. The rheological properties were measured at 120° F. and at atmospheric pressure.

TABLE 2

Rheological properties of water-based drilling fluid with and without copper nitrate (1.0 lb/bbl) at 120° F.

| Rheology Properties | WBM | WBM + Copper Nitrate |
| --- | --- | --- |
| R600 | 36 | 36 |
| R300 | 26 | 27 |
| R200 | 22 | 23 |
| R100 | 12 | 17 |
| R6 | 5 | 5 |
| R3 | 4 | 4 |
| PV, cP | 10 | 9 |
| YP, lb/100 $ft^2$ | 16 | 18 |
| Gel 10 sec, lb/100 $ft^2$ | 4 | 4 |
| Gel 10 min, lb/100 $ft^2$ | 5 | 5 |
| Gel 30 min, lb/100 $ft^2$ | 4 | 4 |

After adding 1.0 g of copper nitrate (as the H2S scavenger), almost no change was observed in the stress-strain behavior of the drilling fluid. The stress-strain behavior of the drilling fluid in shear mode is shown in FIG. 1. However, the yield point/plastic viscosity ratio was increased from 1.6 to 2.0 lb/100 $ft^2$/cP, which is still appropriate for hole-cleaning operations. There was no change in the 10-second and 10-min gel strength, as shown in FIG. 2.

Example 3

To evaluate the corrosion test, a casing coupon, as shown in FIG. 3, was soaked with the drilling fluid which contains 1.0 lb/bbl copper nitrate for 6 hrs at 100° C. and 300 psi. It was found that the corrosion rate was very small, 0.00060 $lb/ft^2$ after 6 hrs of aging. The test was repeated with the same conditions for 24 hrs and the corrosion rate was found to be 0.00084 $lb/ft^2$ after 24 hrs. The standard corrosion was also conducted using an autoclave at 500 psi (10% $H_2S$+ 10% $CO_2$+80% $N_2$) for 6 hrs at 100° C. The corrosion rate was found to be 0.00077 $lb/ft^2$ after 6 hrs. According to these results, copper nitrate is not a corrosive additive to the drilling pipe or casing when used as $H_2S$ scavenger in drilling fluids.

Example 4

Breakeven experiments were performed in a 50 ml Burette with flitted disk 40-60 mm. One milliliter of each of the three fluids (base fluid without $H_2S$ scavenger, base fluid with triazine, and base fluid with copper nitrate, $Cu(NO_3)_2 \cdot 5H_2O$) was placed in the Burette at room temperature (22±1° C.) and 50 ppm $H_2S$ diluted in methane gas was passed upward through the Burette at a flow rate of 1 L/min. The exit $H_2S$ and $CH_4$ gases were detected using a Multi-RAE gas meter. Base sample showed a saturation capacity to $H_2S$ after 7 min, and the fluid solidified after 80 min of continuous injecting of $H_2S$. Base fluid with conventional triazine scavenger showed a breakeven after 20 min, and the fluid solidified after 125 min. However, the developed fluid showed 68 min of continuous absorption of $H_2S$ and with only a slight increase in $H_2S$ exit concentration thereafter, and the fluid solidified after about 170 min of continuous injection of $H_2S$. The sorption capacity of the developed fluid was measured to be around 5143 mg $H_2S$/ml of fluid whereas the base fluid had a sorption capacity of about 503 mg $H_2S$/ml and the fluid with triazine had a sorption capacity of about 1666 mg $H_2S$/ml. These results are shown in FIG. 4.

The reaction between the hydrogen sulfide and the copper nitrates is as follows:

$$H_2S + Cu(NO_3)_2 \rightarrow CuS + 2HNO_3$$

The formed copper sulfide was filtered and separated from the base fluid and regenerated with hot nitric acid. Elemental sulfur was also obtained as a white precipitate. The regeneration temperature and time was controlled to reduce copper sulfide to elemental sulfur and to prevent oxidizing sulfur to sulfuric acid, as represented in the following reaction pathway:

$$3CuS + 8HNO_3 \rightarrow 3Cu(NO_3)_2 + NO_2 + 3S + 2H_2O$$

The invention claimed is:

1. A method of drilling a wellbore into a hydrogen sulfide-containing subterranean geological formation, comprising:
   driving a drill bit to form the wellbore into the subterranean geological formation thereby producing a formation fluid that contains $H_2S$; and
   injecting a drilling fluid composition into the subterranean geological formation through the wellbore,
   wherein the drilling fluid composition comprises
       an aqueous base fluid,
       a polymeric viscosifier, and
       a $H_2S$ scavenger comprising copper nitrate, wherein the $H_2S$ scavenger is present in an amount of 0.5-5 lbs/bbl based on the volume of the drilling fluid composition, and
   wherein copper nitrate present in the drilling fluid composition reacts with $H_2S$ present in the formation fluid to form copper sulfide;
   recovering the copper sulfide from the drilling fluid composition; and
   treating the copper sulfide with nitric acid to regenerate copper nitrate while concurrently forming elemental sulfur.

2. The method of claim 1, wherein the wellbore is a horizontal or a multilateral wellbore.

3. The method of claim 1, wherein a temperature of the wellbore ranges from 50 to 200° C.

4. The method of claim 1,
   wherein the wellbore contains a casing that is made of at least one metal selected from the group consisting of stainless steel, aluminum, and titanium, the casing is exposed to a gaseous mixture containing up to 12 vol % of $H_2S$, and
   wherein a corrosion rate of the casing is no more than 0.0006 lb/ft$^2$ after 6 hours of contacting with the drilling fluid composition.

5. The method of claim 4, wherein the corrosion rate of the casing is no more than 0.00084 lb/ft$^2$ after 24 hours of contacting with the drilling fluid composition.

6. The method of claim 1,
   wherein the formation fluid is produced for at least 1 hour but no more than 4 hours, and
   wherein a concentration of $H_2S$ in the formation fluid is no more than 40 ppm.

7. The method of claim 1, further comprising:
   circulating the drilling fluid composition within the wellbore for at least 30 minutes but no more than 3 hours, after the injecting.

* * * * *